Dec. 30, 1952 — L. R. WHEELER — 2,623,719
AIRCRAFT UNDERCARRIAGE
Filed March 1, 1950
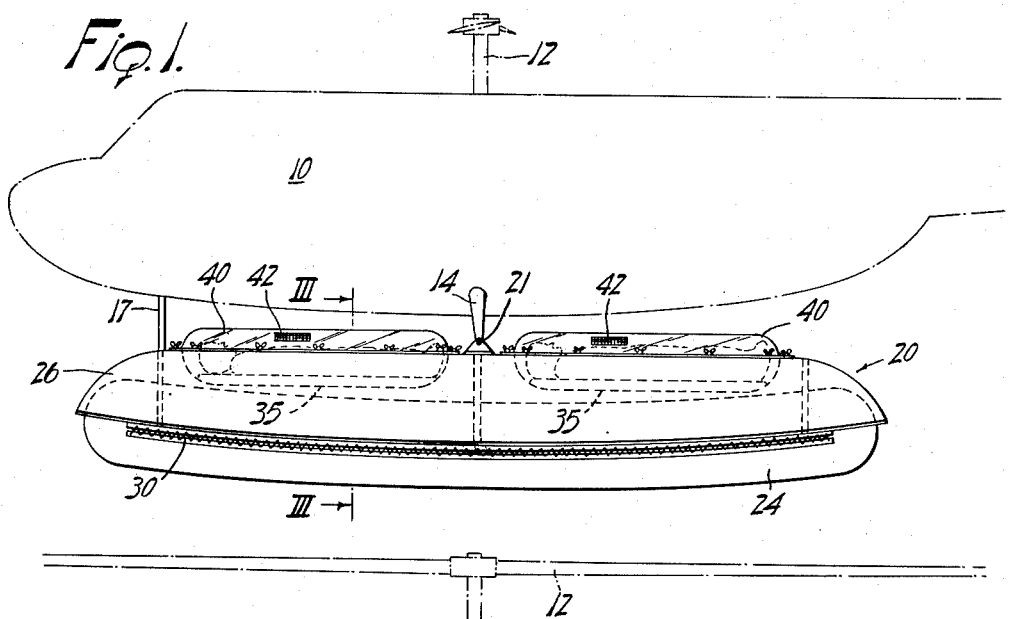
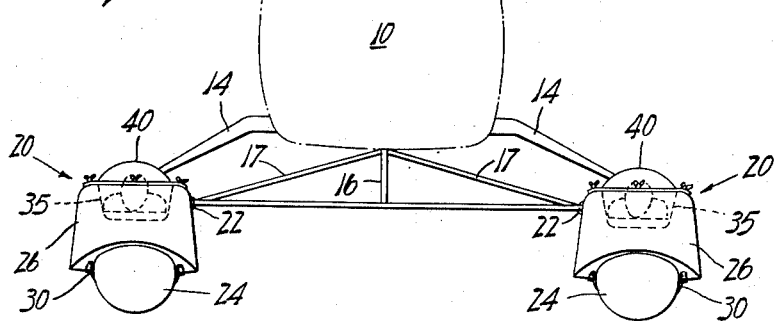
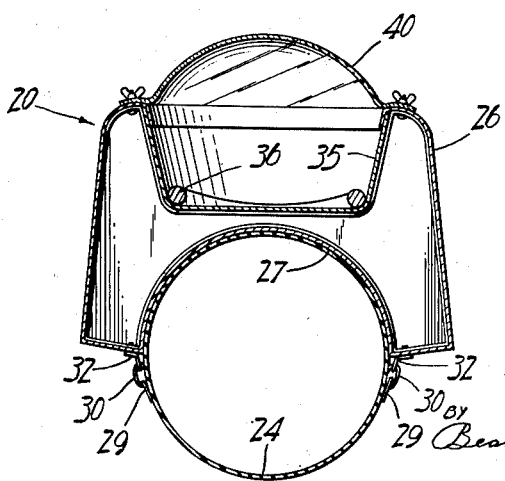
INVENTOR.
LEO R. WHEELER, DECEASED, BY
MARGUERITE M. WHEELER,
ADMINISTRATRIX
BY Bean, Brooks, Buckley & Bean.
ATTORNEYS Patented Dec. 30, 1952

2,623,719

UNITED STATES PATENT OFFICE 2,623,719

AIRCRAFT UNDERCARRIAGE

Leo R. Wheeler, deceased, late of Niagara Falls, N. Y., by Marguerite M. Wheeler, administratrix, Niagara Falls, N. Y., assignor to Bell Aircraft Corporation, Wheatfield, N. Y.

Application March 1, 1950, Serial No. 147,016

8 Claims. (Cl. 244—105)

1

This invention relates to improvements in rescue aircraft, and more particularly to an improved amphibious type landing gear for rescue aircraft of the rotary wing type.

One of the objects of the invention is to provide an improved float type undercarriage arrangement including provision for carrying stretcher borne personnel in improved manner.

Another object of the invention is to provide an improved type combination elastic and rigid dual pneumatic cell undercarriage arrangement incorporating improved personnel carrying means therein.

Other objects and advantages of the invention will appear from the specification hereinafter.

In the drawing:

Fig. 1 is a fragmentary side elevation of a helicopter type aircraft equipped with an undercarriage arrangement of the invention;

Fig. 2 is an end view thereof, and

Fig. 3 is a section, on an enlarged scale, taken along line III—III of Fig. 1.

In the drawing the aircraft is illustrated to include a body portion 10; a rotor 12; main undercarriage legs 14—14 and undercarriage stabilizing legs 16—17. The landing gear of the invention is illustrated in the drawing to comprise a pair of pneumatic pontoon devices such as are indicated generally at 20—20 disposed to extend in parallel spaced relation under the aircraft at opposite sides therealong, and connected to the undercarriage legs 14—16 as indicated at 21—22.

Each of the landing gear units 20 comprises a combination rigid and elastic dual cell construction, one portion of which comprises a sausage-shaped elastic pneumatic cell 24 formed of airtight and water-proof fabric such as rubberized nylon or the like. Each of the cells 24 is nested into a hollow pontoon device 26 which is formed of sheet metal or the like to comprise opposite side walls and a bottom wall upwardly dished as indicated at 27 (Fig. 3) to accommodate the circularly sectioned form of the cell 24 in cradled relation therein. Girth tabs 29 are arranged to extend integrally from the cells 24 and are fitted with grommets for accommodation of lacings 30 which thread through suitably apertured flange devices 32 extending from the bottom edges of the pontoons 26. Thus, the cells 24 are held up snugly in nested position within the pontoons 26, and the pontoons 26 carry the leg connection devices 21—22.

Thus, it will be appreciated that the undercarriage structure at each side of the aircraft includes a rigid sheet metal pontoon device which embraces and supports within its undersurface portion an elastic pneumatic cell, whereby both the pontoon 26 and the cell 24 cooperate to provide water buoyancy support for the aircraft when landing or taxiing on water surfaces. At the same time the elastic cell 24 is adapted for ground contact purposes when the aircraft is landing or resting upon a ground surface, to protect the rigid metal pontoon 26 from ground contact damage and to provide a shock absorbing action for landing operations. Hence, the cell portions 24—24 of the undercarriage structure may be likened to cushion devices for absorbing ground landing shocks and protecting the rigid metal structures from ground contacting damage; while at the same time being adapted to cooperate with the airtight pontoon devices 26 to provide therewith water buoyancy effects for supporting the aircraft upon water surfaces.

It is a particular feature of the present invention that the top surface portions of the pontoons 26—26 are formed with depressions as indicated at 35; the side and bottom wall portions of said depressions being also formed of sheet metal connected integrally with the other portions of the pontoon structures so as to maintain the pontoon structures in the form of hollow airtight members. The depressions 35 are sectionally shaped as illustrated by Fig. 3 for example and longitudinally shaped as indicated in Fig. 1 so as to accommodate in each case a person in lying down position either on blankets or on a stretcher or litter such as is indicated at 36, so as to be comfortably bedded substantially within the profile of the pontoon 26. Thus, for example, as illustrated in Fig. 1, in the case of relatively long pontoon devices, more than one such passenger carrying recess may be provided lengthwise of the pontoon, according to the spaces available in the upper portion of the pontoon structures and in accord with proper balancing of the aircraft.

Thus, the recess portions 35 of the pontoon structures provide passenger carrying spaces such as are particularly suitable for the purpose of carrying the stretcher-borne personnel subsequent to rescue operations or the like; and preferably canopy devices as indicated at 40 will be provided for detachable connection to the pontoons 26 to enclose the upper portions of the recesses 35. Thus, the canopy devices 40 may be formed of transparent plastic material or sheet metal, or any other suitable material as may be preferred; and for purposes of permitting ventilation of the interiors of the passenger carrying spaces the canopy devices 40 may be fitted with air inlet panels 42 which may be screened or louvered or otherwise constructed so as to permit passageway of air therethrough while preventing intake of water such as may splash over the pontoon devices incidental to water landing or take-off operations of the aircraft.

Thus, it will be appreciated that the invention provides a novel combination elastic and rigid dual pontoon structure wherein a portion of the rigid structure is locally depressed to provide a stretcher carrying space or well therein substantially within the ideal profile of the pontoon device, without interfering with the buoyancy efficiencies of the pontoon unit and without interfering with the mounting of the accompanying elastic pneumatic cell device in ideal position thereunder from the standpoint of shock absorbing considerations. It will also of course be appreciated that although only one form of the invention has been shown and described in detail, it will be apparent to those skilled in the art that the invention is not so limited but that various changes may be made therein without departing from the spirit of the invention or the scope of the appended claims.

What is claimed is:

1. An aircraft undercarriage device comprising an elongate elastic air-sealed cell, an air-sealed hollow pontoon overlying said cell and having its under portion recessed to cradle said cell therewithin while said cell extends partially below said pontoon, means maintaining said cell in cradled relation within said pontoon, said pontoon being formed of sheet metal comprising bottom and opposite side and top wall portions thereof, the top wall portion of said pontoon being depressed so as to provide thereby a well portion into which a person may be bedded, and detachable canopy means arranged to cover said depressed well portion.

2. An aircraft undercarriage device comprising an elongate elastic pneumatic cell, an air-sealed hollow sheet metal walled pontoon overlying said cell and having its under portion recessed to cradle and partially enclose said cell therewithin, means maintaining said cell in cradled relation within said pontoon, the top wall portion of said pontoon having a depression therein providing a well portion into which a person may be bedded, and detachable canopy means arranged to cover said depressed well portion.

3. An aircraft undercarriage device comprising an elongate elastic pneumatic cell, an air-sealed hollow sheet metal pontoon overlying said cell and having its under portion recessed to cradle and partially enclose said cell therewithin, and means maintaining said cell in cradled relation within said pontoon, the top wall portion of said pontoon being depressed so as to provide thereby a well into which a person may be bedded.

4. An aircraft undercarriage device comprising a hollow air-sealed rigid pontoon comprising bottom and opposite side and top wall portions, the top wall portion of said pontoon having a depression therein providing a well portion into which a person may be bedded, and detachable canopy means arranged to cover said well portion.

5. An aircraft undercarriage device comprising an elongate elastic air-sealed cell, a rigid pontoon overlying said cell and having its under portion recessed to cradle said cell therewithin while said cell extends therebelow, means holding said cell in cradled relation under said pontoon, said pontoon being depressed at its upper surface so as to provide thereby a well portion into which a person may be bedded, and detachable canopy means arranged to cover said depressed well portion.

6. An aircraft undercarriage device comprising an elastic pneumatic cell, a rigid pontoon overlying said cell and having its under portion recessed to cradle and partially enclose said cell therewithin, means holding said cell in cradled relation within said pontoon, said pontoon being provided with a depression in its upper surface whereby to provide a well portion into which a person may be bedded, and detachable canopy means arranged to cover said depressed well portion.

7. An aircraft undercarriage device comprising an elastic pneumatic cell, a rigid pontoon overlying said cell and having its under portion recessed to cradle and partially enclose said cell therewithin, and means holding said cell in cradled relation within said pontoon, the top portion of said pontoon having a depression formed therein so as to provide a well into which a person may be bedded.

8. An aircraft undercarriage device comprising an elongate hollow air-sealed pontoon formed of sheet metal comprising bottom and opposite side and top wall portions thereof, the top wall portion of said pontoon having a depression formed therein so as to provide thereby a well portion into which a person may be bedded, and detachable canopy means arranged to cover said depressed well portion.

MARGUERITE M. WHEELER,
*Administratrix of the Estate of Leo R. Wheeler, Deceased.*

REFERENCES CITED

The following references are of record in the file of this patent:

UNITED STATES PATENTS

| Number | Name | Date |
|---|---|---|
| 1,709,050 | Wright | Apr. 16, 1929 |
| 1,971,637 | Bellanca | Aug. 28, 1934 |
| 2,439,196 | Wolf | Apr. 6, 1948 |
| 2,553,207 | Peltier | May 15, 1951 |

FOREIGN PATENTS

| Number | Country | Date |
|---|---|---|
| 875,620 | France | June 29, 1942 |